Patented Dec. 14, 1926.

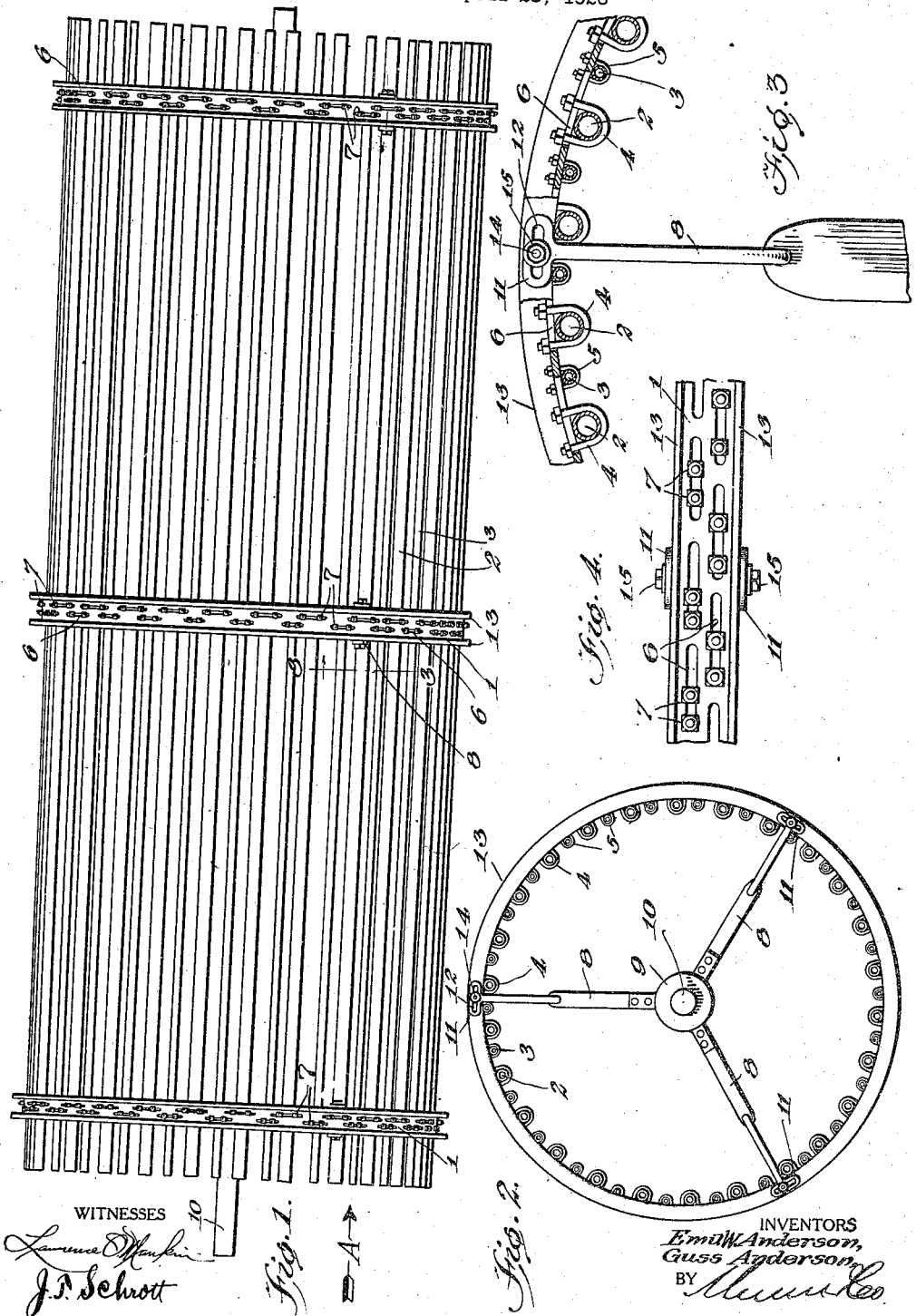

1,610,350

UNITED STATES PATENT OFFICE.

EMIL W. ANDERSON AND GUSS ANDERSON, OF SEATTLE, WASHINGTON.

SEPARATOR SCREEN.

Application filed April 28, 1926. Serial No. 105,305.

This invention relates to improvements in separators and is specifically designed for the purpose of separating small, intermediate and large sizes of fish, the separator embodying several novel constructions one of the important ones of which is the alternate arrangement of large and small longitudinal pipes and the means by which the spaces between pipes can be varied.

Other objects and advantages will appear in the following specification, reference being had to the accompanying drawing, in which Figure 1 is a side elevation of the improved separator, Figure 2 is an end elevation of the separator.

Figure 3 is a detail sectional view which may be considered as taken on the line 3—3 of Figure 1, Figure 4 is a detail plan view of one of the hoops showing the slots by means of which the spacing between pipes can be varied.

It is the purpose of the invention to provide a revoluble screen or drum into one end of which considerable quantities of fish may be dumped whereupon the fish are made to assemble in longitudinal positions as they ultimately reach the periphery of the drum and permitted to drop through when they move down to spaces of appropriate size. The so-called screen or drum is composed of a plurality of hoops 1 upon the interior of which pipes or rods 2 and 3 are secured by means of U-bolts or clips 4 and 5 (Fig. 3).

The pipes or rods 2 are relatively large while the pipes or rods 3 are relatively small. They are distributed in alternation, thereby roughly defining what might be termed a valley between the large pipes 2. The alternating arrangement of large and small pipes causes the fish to assemble in longitudinal positions when the periphery of the drum is reached, and inasmuch as the pipes are spaced apart the fish are then permitted to drop through.

In order that assortment as to size may be had, the screen is made of slightly tapering formation toward the inlet end designated by the arrow A (Fig. 1). This is accomplished by making the various hoops of slightly smaller sizes. Inasmuch as the various pipes are evenly spaced apart on the interior of each of the hoops it follows that the spacing between pipes at the left end of the screen in Figure 1 will be slightly less than at the right end. The small fish are thus permitted to drop through first, principally at the left end of the screen. Fish of intermediate size will drop through in the region of the center, and the fish of larger size will discharge both from the right end of the drum and through the largest spaces between pipes at that end.

Adjustment of the spaces between the pipes may be had by virtue of the slots 6 (Fig. 4) through which the ends of the various clips 4 and 5 extend. These ends of the clips are threaded, and carry nuts 7 for the obvious purpose of tightening the adjustment when once reached. Spacing between pipes may be of any dimension desired, it being noted that the slots 6 are of considerable extent, and if the foregoing even spacing between pipes is for some reason required to be varied some the adjustment may be made to then suit particular conditions.

Support for the revoluble screen is had by spiders for each of the hoops. One of these is shown in Figure 2 and a detail of the central spider is shown in Figure 3. The spider generally designated 8 is composed of a plurality of radial arms, assembled upon a hub 9 through which the shaft 10 extends.

The shaft may be mounted and driven in any suitable manner. The extremity of each spider arm is enlarged laterally into a head 11. The head is provided with a slot 12 extending lengthwise thereof and at right angles to the axis of the arm itself. The hoops 1 each have a pair of upstanding flanges 13 for the double purpose of strengthening the hoops and for providing a place to which the radial arms may be secured. A bolt 14 (Fig. 3) passes through one of the flanges and through the slot 12 of the adjacent head where it is secured in place by a nut 15. The purpose of the slot 12 in addition to that just mentioned, is to permit some slight adjustment of the arms so that the arms may conveniently pass through the nearest spaced pipes 2 and 3, it being remembered that the provision for circumferential adjustment of the pipes will involve a slight variation in one direction or the other of the nearest space through which an arm 8 may pass.

The operation is readily understood. The screen or drum is preferably placed on a slight incline as shown in Figure 1 with the intake end highest. The various hoops 1 are increasingly larger in diameter toward the discharge end, and inasmuch as the pipes 2 and 3 are suspended from the interior of the hoop at approximately even distances apart it follows that the spacing between pipes increases slightly toward the discharge end of the screen. This increase in the spacing serves the important function of preventing the fish from sticking in the spaces, but as previously stated performs the additional function of assorting the fish as to size. The smallest fish will drop through at the left extremity of the screen, the fish of intermediate size in the region of the center and the larger fish will discharge at the right end of the drum and also fall through the largest spaces adjacent to that end.

It is desirable and in fact necessary in a screen for the specific purpose herein intended to cause the fish to assemble in position longitudinally of the drum. The large pipes 2 accomplish the purpose. They produce upstanding ridges causing the fish to move over into the valley therebetween and assume the desired longitudinal position in the spaces between the large and small pipes. The spacing between pipes may be varied by use of the adjustment that the slots 6, clips 4 and nuts 7 afford. Any shifting in position of a pair of the pipes 2 and 3 concerned, will require a slight adjustment of the arm 8 so that the arm may still extend through the space between the two pipes. The bolt 14, nut 15 and slot 12 in the head 11 of the arm provide for the necessary adjustment.

While the construction and arrangement of the improved fish separator is that of a generally preferred form, obviously modifications and changes may be made without departing from the spirit of the invention or the scope of the claims.

We claim:—

1. A cylindrical separator screen composed of a plurality of spaced apart longitudinal elements of relatively large and small sizes in alternation, and means for rotating the screen causing assembling of fish in longitudinal position and permitting the fish to drop through the spaces.

2. A separator screen of cylindrical formation being composed of a plurality of longitudinally extending elements of alternately large and small size in cylindrical order roughly defining longitudinal ridges and intermediate valleys on the interior of the screen.

3. A separator screen composed of a plurality of longitudinal elements consisting of relatively large and relatively small pipes occurring in alternation, hoops upon which the elements are assembled in cylindrical formation, defining alternate ridges and valleys on the interior of the screen, said hoops having circumferentially extending slots, and means by which the elements are supported upon the hoops in spaced relationship comprising clips applied to said elements and having the ends extending through the slots and carrying nuts permitting adjustment of the spaces between said elements.

4. A separator screen composed of a plurality of longitudinal elements consisting of relatively large and relatively small pipes occurring in alternation, hoops upon which the elements are assembled in cylindrical formation, said hoops having circumferentially extending slots, and means by which the elements are supported upon the hoops in spaced relationship comprising clips applied to said elements and having the ends extending through the slots and carrying nuts permitting adjustment of the spaces between said elements, spiders having radial arms supporting the hoops, and means by which the arms are secured to the hoops, said arms terminating in slotted heads through which said means pass permitting adjustment of the arms as to position to agree with adjustments of the elements as to spacing.

5. A separator screen comprising a plurality of hoops of progressively different diameters, said hoops having peripheral flanges and circumferential slots, a plurality of longitudinal elements assembled inside of the hoops in cylindrical formation, said elements alternately being of relatively large and small diameter, clips by which the elements are applied to the hoops including threaded portions extending through the slots and receiving nuts for securing the clips and permitting adjustment as to spacing between said elements, spiders having radial arms supporting the hoops said radial arms passing between certain elements and terminating in slotted ends applied to the flanges, and means passing through the flanges and the slots of said heads securing the parts in position but permitting slight adjustment of the arms in relationship to the hoops to compensate for adjustment of adjacent elements as to spacing.

EMIL W. ANDERSON.
GUSS ANDERSON.